US012504384B2

(12) United States Patent
Fan et al.

(10) Patent No.: US 12,504,384 B2
(45) Date of Patent: Dec. 23, 2025

(54) WAFER DEFECT INSPECTION SYSTEM

(71) Applicant: SYNTEC RESOURCES CO., LTD., Taoyuan (TW)

(72) Inventors: Kang-Feng Fan, Hsinchu County (TW); Ping-Chun Chang, Hsinchu County (TW)

(73) Assignee: SYNTEC RESOURCES CO., LTD., Taoyuan (TW)

( * ) Notice: Subject to any disclaimer, the term of this patent is extended or adjusted under 35 U.S.C. 154(b) by 223 days.

(21) Appl. No.: 18/240,365

(22) Filed: Aug. 31, 2023

(65) Prior Publication Data

US 2025/0044241 A1 Feb. 6, 2025

(30) Foreign Application Priority Data

Aug. 3, 2023 (TW) ................. 112129185

(51) Int. Cl.
*G01N 21/95* (2006.01)
*G01N 21/88* (2006.01)

(52) U.S. Cl.
CPC ..... *G01N 21/9505* (2013.01); *G01N 21/8806* (2013.01); *G01N 21/8851* (2013.01); *G01N 2021/8809* (2013.01); *G01N 2021/8861* (2013.01); *G01N 2021/8887* (2013.01); *G01N 2201/0638* (2013.01); *G01N 2201/1053* (2013.01)

(58) Field of Classification Search
CPC .......... G01N 21/9505; G01N 21/8806; G01N 21/8851; G01N 2021/8809; G01N 2021/8861; G01N 2021/8887; G01N 2201/0638; G01N 2201/1053
See application file for complete search history.

(56) References Cited

U.S. PATENT DOCUMENTS

2012/0307236 A1* 12/2012 Ortner ................ G01N 21/9505
356/239.3
2019/0250108 A1 8/2019 Sachs et al.

FOREIGN PATENT DOCUMENTS

CN 115100168 9/2022

OTHER PUBLICATIONS

Search Report for Taiwan counterpart application TW112129185 date May 29, 2024.
(English translation) Search Report for Taiwan counterpart application TW112129185, date May 29, 2024.

* cited by examiner

*Primary Examiner* — Jamil Ahmed

(57) ABSTRACT

A wafer defect inspection system is disclosed, and comprises a line light source, a camera and a processor, wherein the processor is configured to control the line light source to provide an inspection light to be incident on a wafer, wherein an included angle between the inspection light and the surface of the wafer ranges from 45° to 90°. After incidence on the wafer, the inspection light travels inside the wafer according to the principle of total reflection, and when encountering a crack, part of the inspection light exits from the surface of the wafer through the crack. Moreover, the processor controls the camera to obtain a wafer image containing at least one defect feature, and after processing the wafer image into an inspection wafer image, compares the wafer image with a reference wafer image, so as to know the at least one defect feature.

9 Claims, 9 Drawing Sheets

WAFER DEFECT INSPECTION SYSTEM

TECHNICAL FIELD

The present invention relates to the technical field of Automated optical inspection (AOI), in particular to a wafer defect inspection system.

BACKGROUND

Engineers who are familiar with the manufacturing of integrated circuits (ICs) must know that a Dedicated IC Foundry has four main manufacturing procedures, namely, etch, photo, diffusion and thin film. In other words, in the process of manufacturing a plurality of IC chips on a wafer, these four manufacturing procedures will be used repeatedly until an electronic circuit including a plurality of active components (i.e., transistors) and a plurality of passive components is implemented in each IC chip.

It is worth noting that after any process of etching, photo, diffusion or thin film is completed, the wafer must be inspected by an automated optical inspection (AOI) equipment before being transferred to the next process. For example, Taiwan Patent No. I713130 discloses an on-line inspection system for semiconductor chips, which includes a conveyor, a camera and a processor, wherein the conveyor is used to transport a wafer from a processing station to an inspection station, so that the camera faces the wafer to take at least one wafer image. The processor is used to process the wafer image to determine whether the wafer has surface defects. The defects are, for example, particles whose line widths are not up to standard and/or can be used as killer defects.

Unfortunately, the conventional AOI still shows some shortcomings in detecting wafer scratch. In view of this, the inventor of this case made great efforts in research and creation, and finally developed a lead-free metal halide memristor for a wafer defect inspection system of the present invention.

SUMMARY

A first object of the present invention is to provide a wafer defect inspection system, which is used to realize scratch inspection of a wafer by using the principle of total reflection.

In order to achieve the first object of the present invention, a first embodiment of the wafer defect inspection system is proposed, which includes:
  a line light source;
  a camera arranged above the wafer and facing the wafer; and
  an electronic device coupled with the camera and the line light source;
  wherein the electronic device is configured to perform the following multiple functions:
    controlling the line light source to provide an inspection light to be incident on an edge surface of the wafer, wherein an included angle between the inspection light and the edge surface is adjusted so as to cause the inspection light travel inside the wafer according to the principle of total reflection after being incident on the wafer; in the case of encountering a crack, part of the inspection light exits from the surface of the wafer through the crack;
    controlling the camera to capture the wafer so as to obtain a wafer image containing at least one defect feature; wherein the inspection light is emitted from a defect position on the surface of the wafer, and the defect feature corresponds to the defect position in the wafer image; and
    comparing the wafer image with a reference wafer image to identify the at least one defect feature.

In one embodiment, the defect feature is wafer scratch.

In one embodiment, the wafer defect inspection system according to the present invention includes a rod lens, which is arranged between the line light source and the wafer and located on an optical path of the inspection light.

In one embodiment, the camera is a line scan camera.

In one embodiment, the wafer defect inspection system according to the present invention further includes:
  a first adjusting mechanism connected with the camera and coupled with the electronic device; and
  a second adjusting mechanism pivoted to the line light source and coupled to the electronic device.

In one embodiment, the wafer defect inspection system according to the present invention further includes:
  an optical device arranged between the linear light source and the wafer, and located on the optical path of the inspection light, for guiding the inspection light so that there is the included angle between the inspection light and the edge surface;
  wherein that optical device is any one selected from a group consisting of a reflector and a polariscope.

In one embodiment, the wafer defect inspection system according to the present invention further includes:
  an optical device, which is arranged between the linear light source and the rod lens and located on the optical path of the inspection light, for guiding the inspection light so that the inspection light vertically enters the rod lens;
  wherein that optical device is any one selected from a group consisting of a reflector and a polariscope.

In one embodiment, the wafer is any one selected from a group consisting of a silicon wafer, a germanium wafer, a gallium arsenide wafer, and a gallium nitride wafer, and has any wafer size selected from a group consisting of 3 inches, 4 inches, 6 inches, 8 inches, 12 inches, and 18 inches.

In one embodiment, the electronic device includes a processor and a memory storing an application program, so that the processor can access the memory to execute the application program, thereby enabling the plurality of functions.

In one embodiment, the application program includes:
  an image processing program, wherein the processor executes the image processing program so as to be configured to perform an image processing on the wafer image;
  a defect identification program, wherein the processor executes the defect identification program so as to be configured to compare the wafer image with the reference wafer image, thereby identifying the at least one defect feature; and
  a control program, wherein the processor executes the control program, thereby controlling the first adjusting mechanism to adjust a horizontal position and a vertical position of the camera, and controlling the second adjusting mechanism to pivot the line light source to adjust the included angle.

A second object of the present invention is to provide a wafer defect inspection system for detecting impurity particles and/or etching residues on the surface of a wafer by the principle of total reflection.

In order to achieve the second object of the present invention, a second embodiment of the wafer defect inspection system is proposed, which includes:
- a line light source;
- a camera arranged above the wafer and facing the wafer; and
- an electronic device coupled with the camera and the line light source;
- wherein the electronic device is configured to perform the following functions: controlling the line light source to provide an inspection light to be incident on an edge surface of the wafer, wherein an included angle between the inspection light and the edge surface is adjusted so as to cause the inspection light travel inside the wafer according to the principle of total reflection after being incident on the wafer, and part of the inspection light will be emitted from the surface of the wafer; wherein, under the condition that impurity particles and/or etching residues exist on the surface of the wafer, the inspection light emitted from the surface of the wafer will be blocked by the impurity particles and/or etching residues;
- controlling the camera capture the wafer so as to obtain a wafer image containing at least one defect feature; wherein, the inspection light is blocked from a defect position on the wafer surface, and the defect feature corresponds to the defect position in the wafer image;
- comparing the wafer image with a reference wafer image to identify the at least one defect feature.

DESCRIPTION OF EMBODIMENTS

In order to more clearly describe a wafer defect inspection system proposed by the present invention, the preferred embodiment of the present invention will be described in detail with the accompanying drawings.

First Embodiment

Figure 1A:
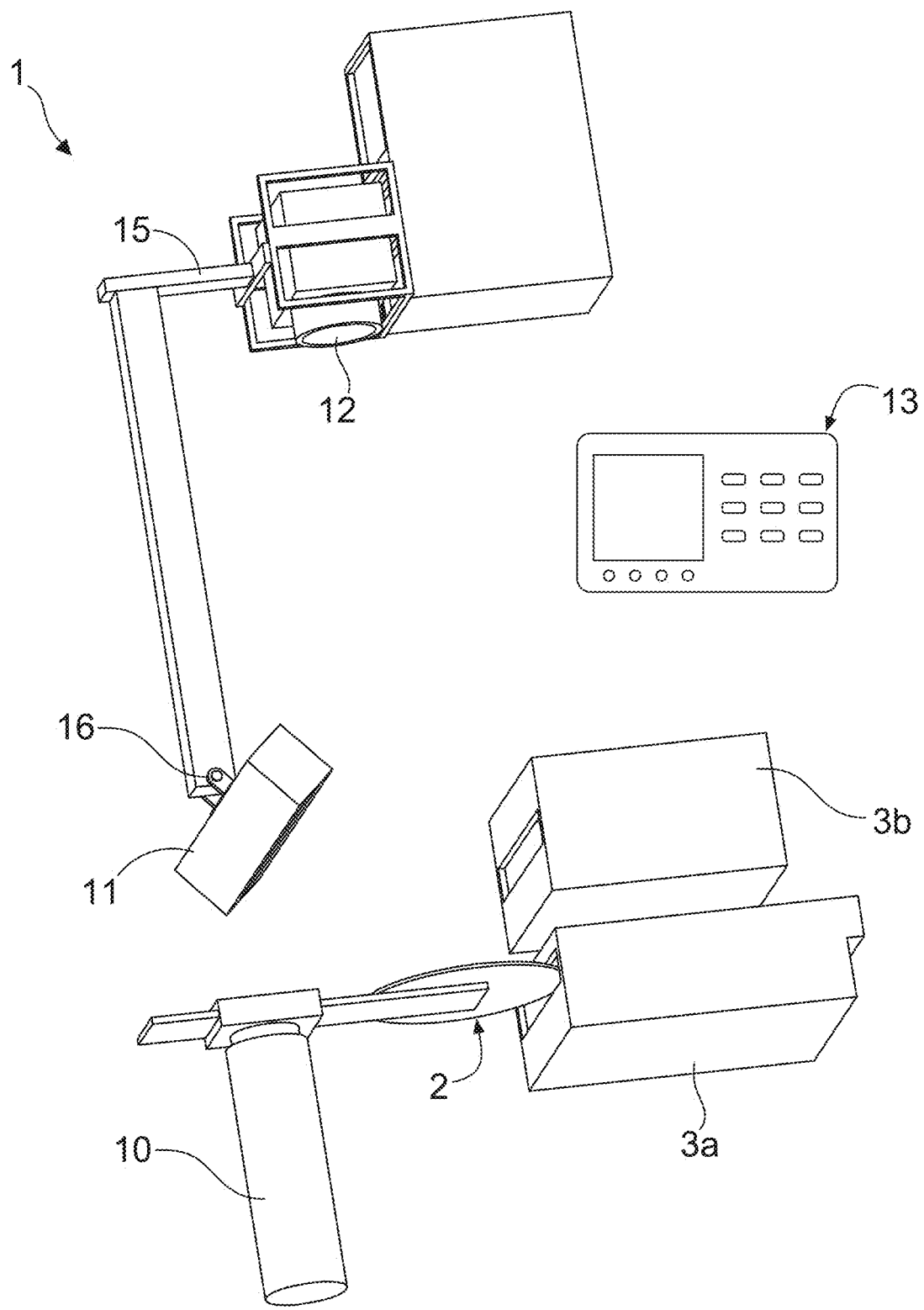
FIG. 1A is a first perspective view of a wafer defect inspection system according to the present invention.
Figure 1B:
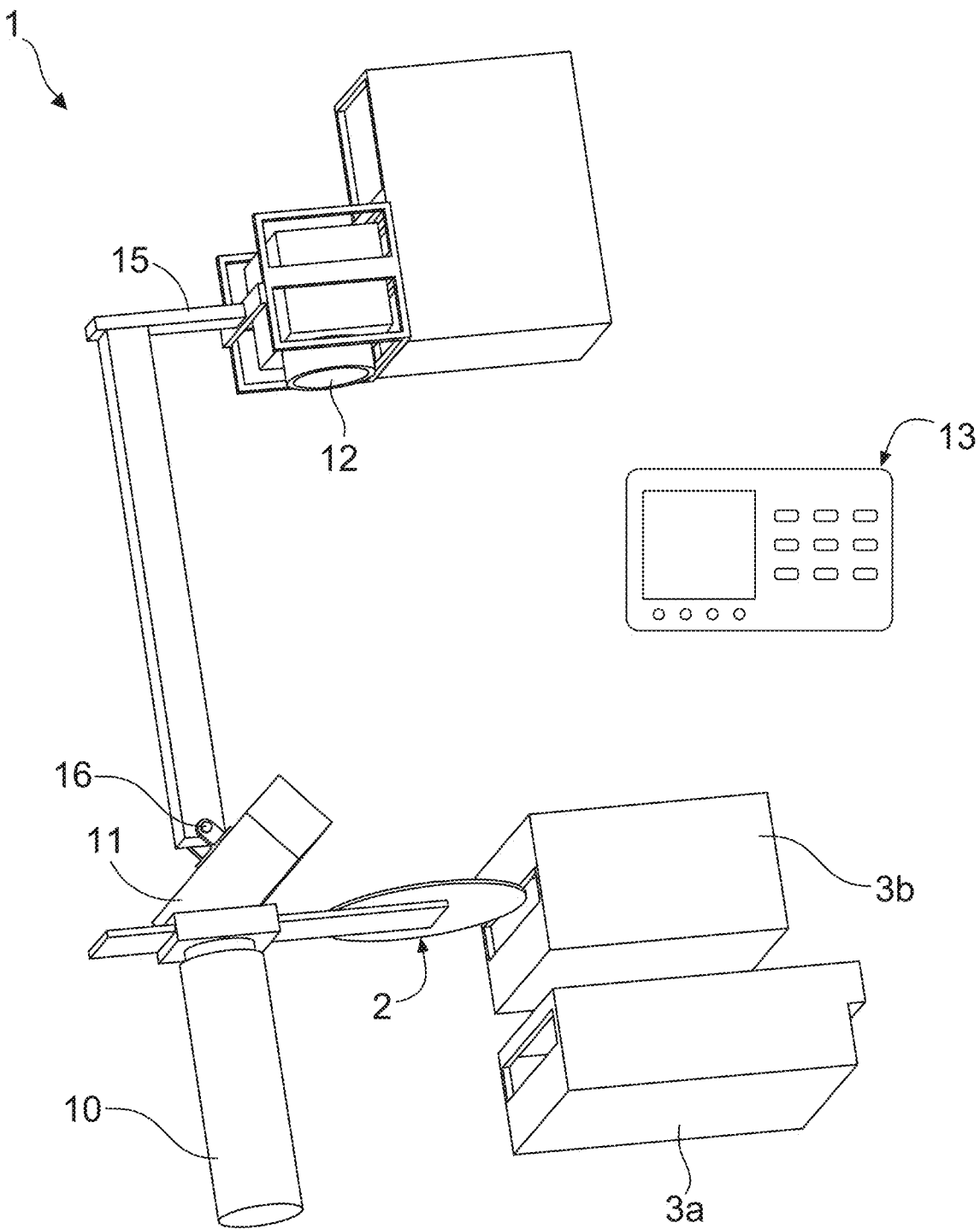
FIG. 1B is a second perspective view of a wafer defect inspection system according to the present invention.
Figure 1C:
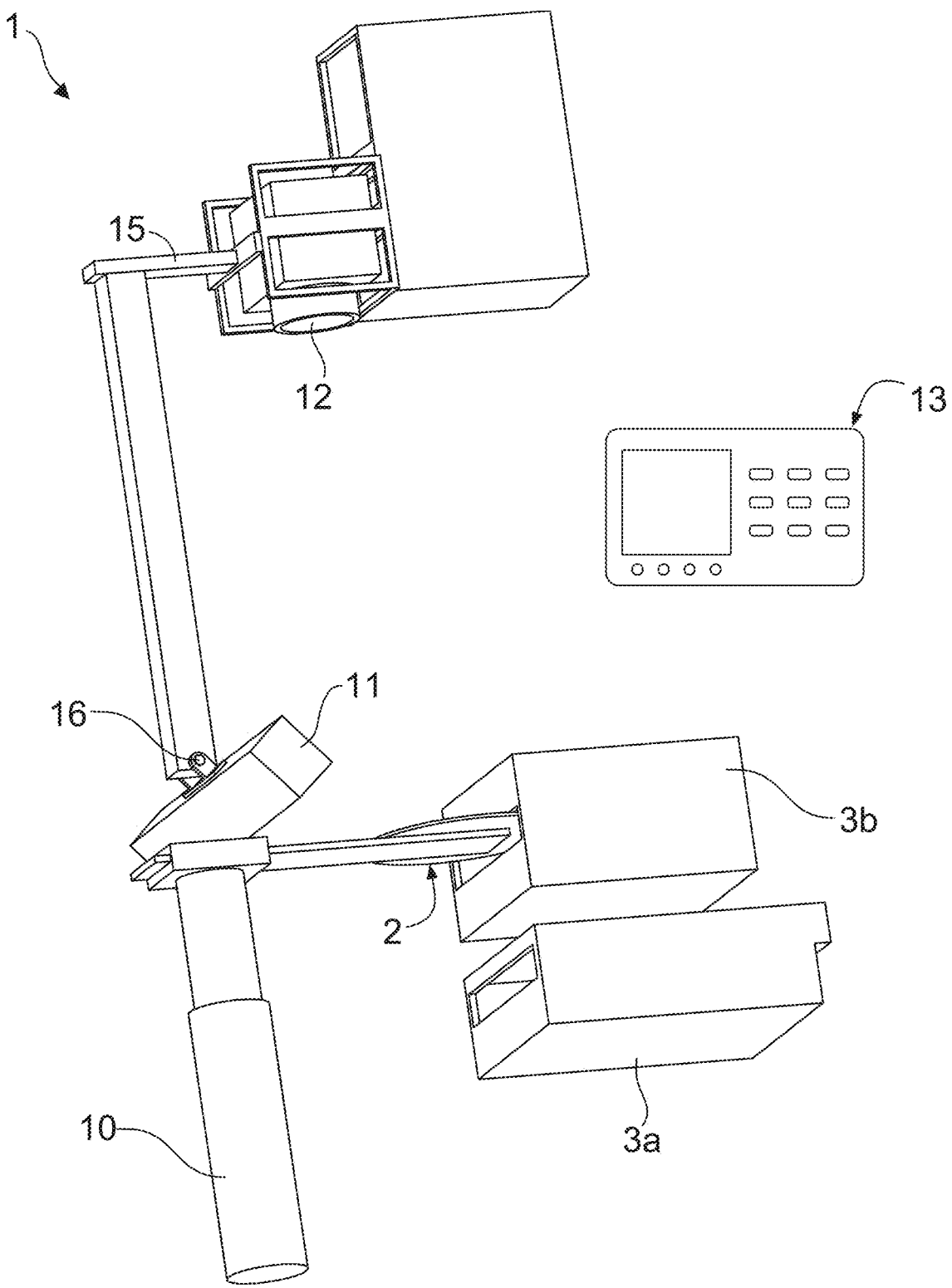
FIG. 1C is a third perspective view of a wafer defect inspection system according to the present invention.

FIGS. 1A, 1B and 1C show the first, second and third perspective views of a wafer defect inspection system according to the present invention. As shown in FIG. 1A, FIG. 1B and FIG. 1C, a wafer transfer device 10 transfers a wafer 2 from a first process station to a second process station, and the wafer defect inspection system 1 of the present invention is arranged on a wafer transferring path between the first process station and the second process station, for realizing scratch inspection of a wafer 2 by using the principle of total reflection. In practical application, the wafer 2 can be a silicon wafer, a germanium wafer, a gallium arsenide wafer, or a gallium nitride wafer. Moreover, the size of the wafer 2 can be 3 inches, 4 inches, 6 inches, 8 inches, 12 inches, or 18 inches. In other words, the wafer defect inspection system of the present invention can be applied to any kind of wafer scratch inspection. It should be understood that reference numeral 3a refers to the wafer output device of the first process station, while reference numeral 3b refers to the wafer input device of the second process station. In more detail, the wafer defect inspection system 1 of the present invention mainly includes a line light source 11, a camera 12, an electronic device 13 coupled to the camera 12 and the linear light source 11, a first adjusting mechanism 15, and a second adjusting mechanism 16; the camera 12 is a line scan camera and arranged above the wafer 2 so as to face the wafer 2. In an embodiment, the electronic device 13 can be, but not limited to, a desktop computer, a notebook computer, an industrial computer, a cloud computer, an All-in-one computer, a tablet computer, or a smart phone.

Figure 2:
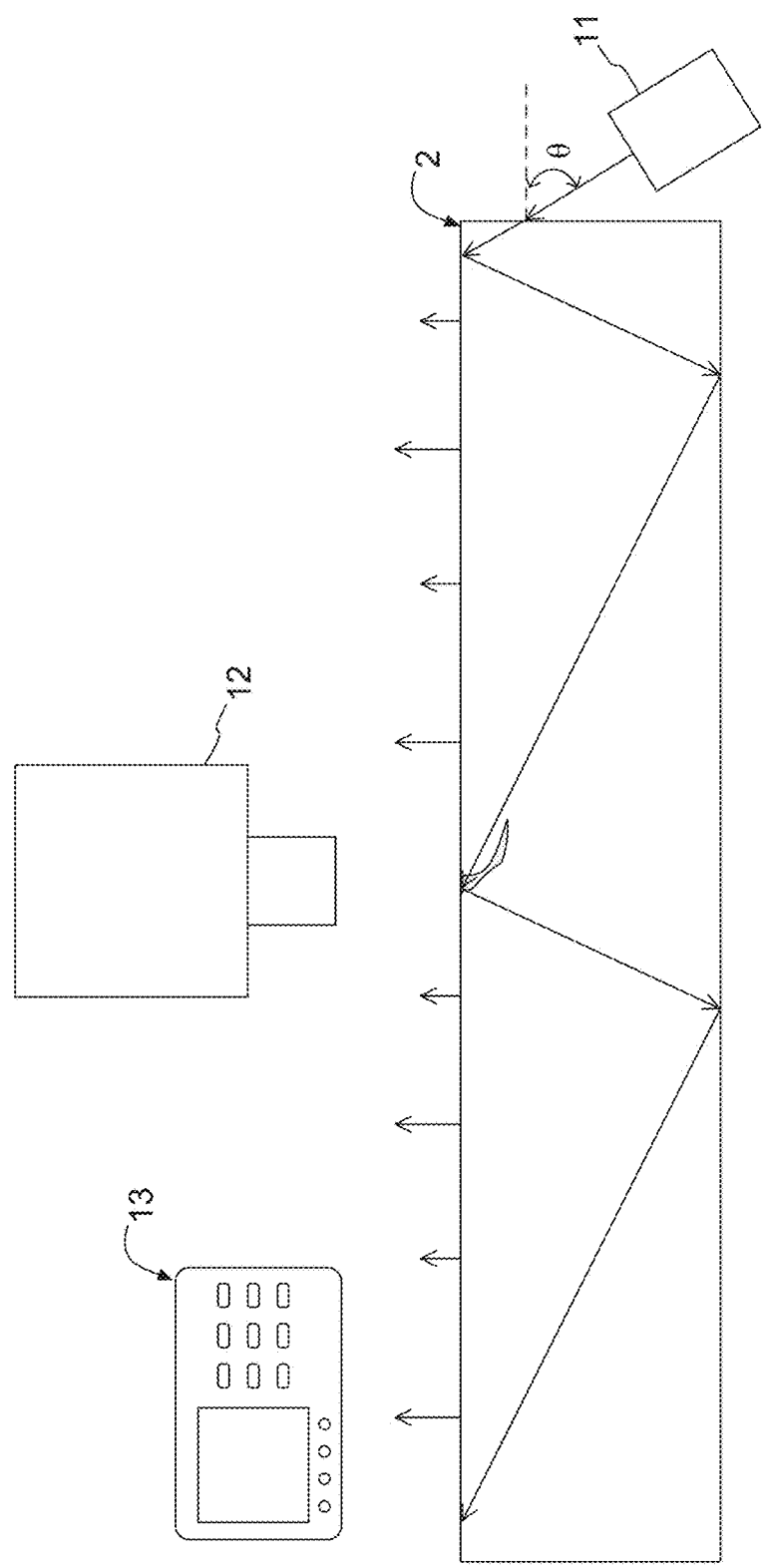
FIG. 2 is a block chart of the electronic device in FIG. 1A.

Continually referring to FIGS. 1A, 1B and 1C, please also refer to FIG. 2, which is a block chart of the electronic device 13 in FIG. 1A. According to the design of the present invention, the electronic device includes a control unit (i.e., processor) 131 and a memory unit 134, wherein the memory unit 134 stores an application program, and the processor 131 accesses the memory unit 134 to execute the application program. When the application program is executed, the processor 131 is configured to perform a plurality of functions, wherein the first function is to control the line light source 11 to provide an inspection light incident on an edge surface of the wafer 2. It is worth noting that the second function is to control the first adjusting mechanism 15 to adjust a horizontal position and a vertical position of the camera 12, and to control the second adjusting mechanism 16 to pivot the line light source 11 so that there an included angle θ between the inspection light and the edge surface of the wafer is adjusted, thereby causing the inspection light travel inside the wafer 2 according to the principle of total reflection after being incident on the wafer 2. Moreover, when a crack is encountered, part of the inspection light passes through the crack and exits from the surface of the wafer 2. More specifically, if there is a wafer scratch on the wafer 2, when the inspection light traveling inside the wafer 2 according to the principle of total reflection encounters a crack formed by the wafer scratch, part of the inspection light will pass through the crack and emit from the surface of the wafer 2.

Figure 3:
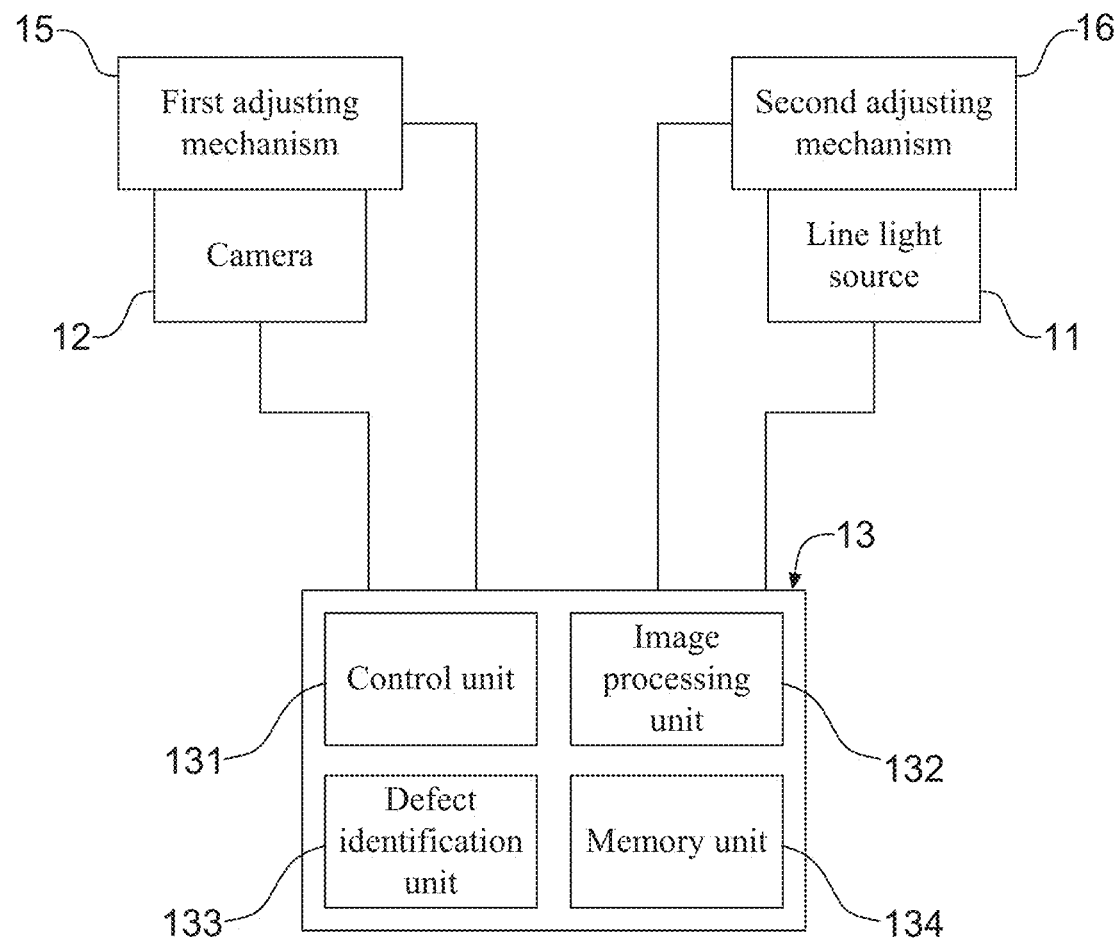
FIG. 3 is a first side sectional view of the wafer in FIG. 1A.

FIG. 3 is a first side sectional view of the wafer in FIG. 1A. As shown in FIGS. 2 and 3, the third of the plural functions is to control the camera 12 to shoot the wafer 2, so as to obtain a wafer image containing at least one defect feature; the inspection light is emitted from a defect position on the surface of the wafer 2, and the defect feature corresponds to the defect position in the wafer image. As shown in FIG. 1A, the first adjusting mechanism 15 is connected with the camera 12 and coupled with the processor 13, so that the camera 12 controls the first adjusting mechanism 15 to adjust a horizontal position and a vertical position of the camera 12, so as to obtain a wafer image of the wafer containing at least one defect feature at an optimal image taking position. In other words, the processor 13 can perform an analysis of light intensity distribution on the wafer image to confirm whether the wafer image contains at least one defect feature. The fourth function is to compare the wafer image with a reference wafer image to identify the at least one defect feature. After analyzing the light intensity distribution of the wafer image, an inspection wafer image marked with the position of the defect feature can be generated. It should be understood that by comparing the inspection wafer image with a reference wafer image, whether wafer scratch exists in the wafer 2 can be identified and judged.

As shown in FIG. 2, in one embodiment, the application program includes an image processing program 13M1, a defect identification program 13M2 and a control program 13M3, wherein the processor 13P executes the image processing program 13M1, so as to be configured to perform an image processing on the wafer image to obtain the detected wafer image. Furthermore, the processor 13P executes the defect identification program 13M2, so as to be configured to compare the inspection wafer image with the reference wafer image, thereby identifying the at least one defect feature (i.e., wafer scratch). On the other hand, the processor 13P executes the control program 13M3 to control the first adjusting mechanism 15, the second adjusting mechanism 16 and/or the camera 12.

Figure 4:
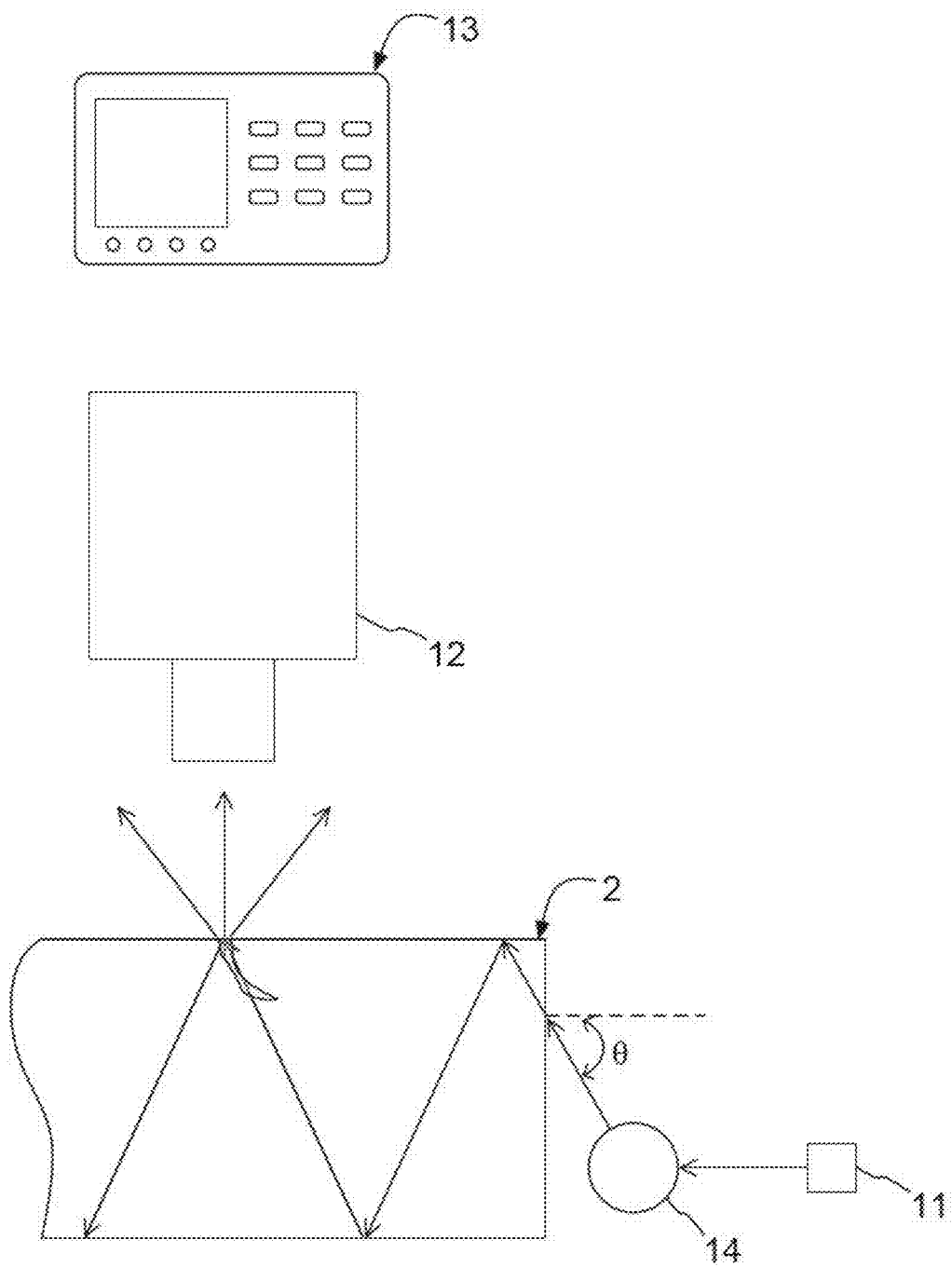
FIG. 4 is a second side sectional view of the wafer in FIG. 1A.

FIG. 4 shows a second side sectional view of the wafer 2 in FIG. 1A. As shown in FIGS. 1A and 4, when the wafer defect inspection system 1 of the present invention is actually applied, a Rod lens) 14 can be further arranged between the line light source 11 and the wafer 2, and positioned on an optical path of the inspection light. According to this arrangement, if the illuminance of the inspection light emitted by the line light source 11 on the surface of the wafer 2 is 40 lux, after focusing by the rod lens 14, the illuminance of the inspection light on the surface of the wafer 2 can be increased to 400 lux.

Figure 5:
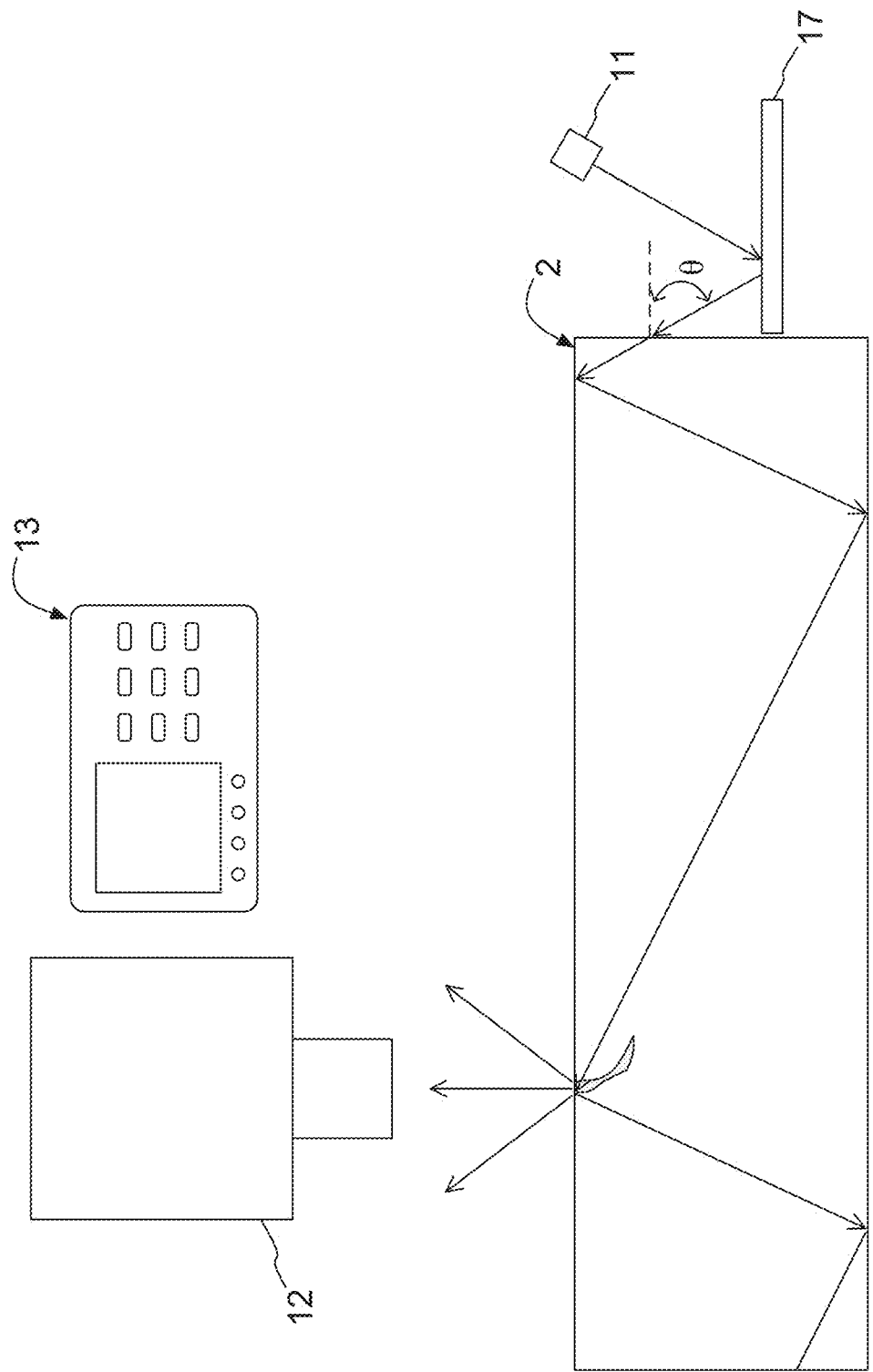
FIG. 5 is a third side sectional view of the wafer in FIG. 1A.

FIG. 5 shows a third side sectional view of the wafer 2 in FIG. 1A. As shown in FIGS. 1A and 4, when the wafer defect inspection system 1 of the present invention is actually applied, an optical device 17 can be further arranged between the line light source 11 and the wafer 2, and positioned on an optical path of the inspection light. According to this arrangement, the inspection light can be guided by the optical device 17 to ensure that the included angle θ exists between the inspection light and the edge surface of the wafer 2. In a feasible embodiment, the optical device can be composed of a mirror or a polarizer.

Figure 6:
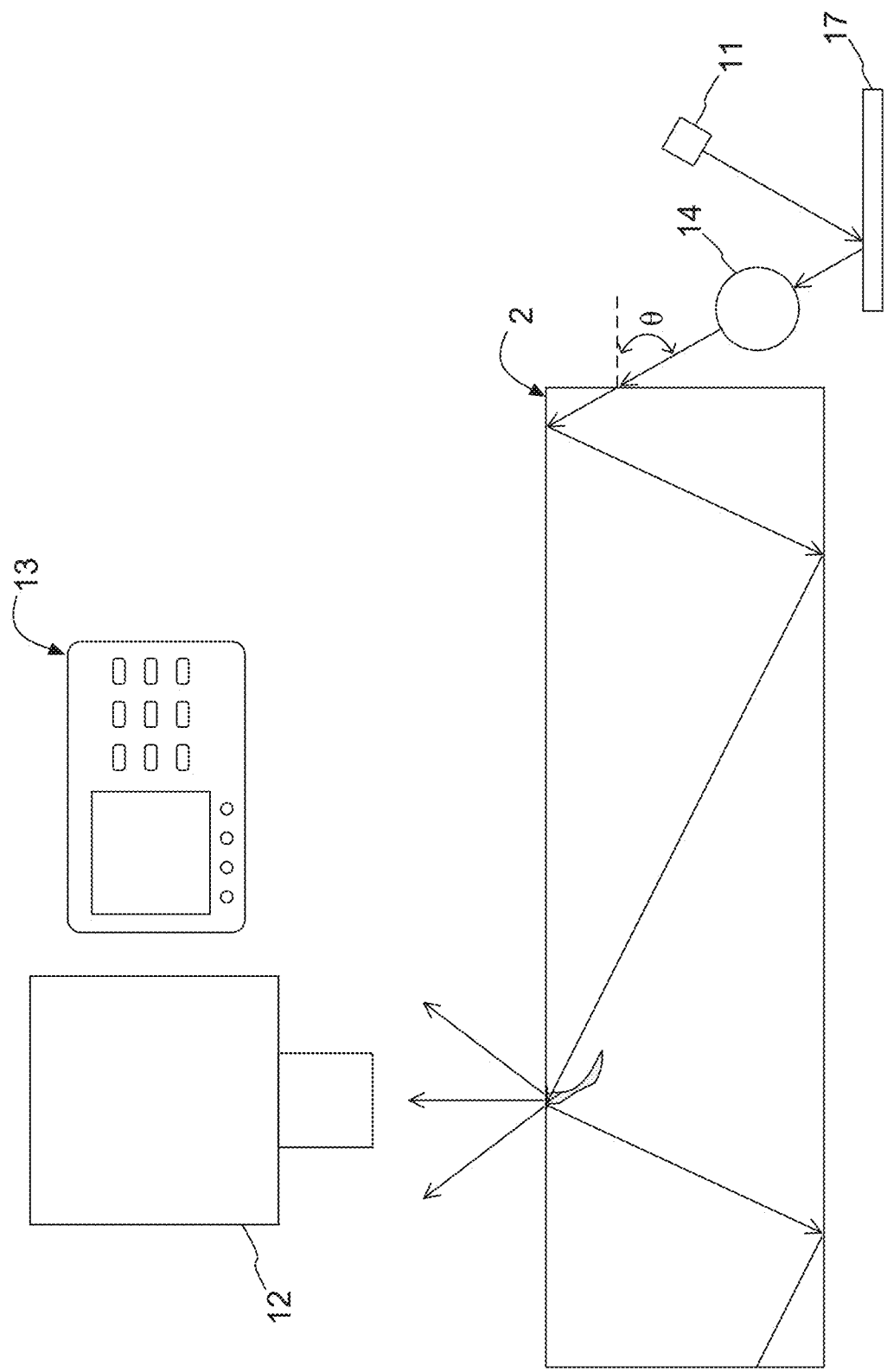
FIG. 6 is a fourth side sectional view of the wafer in FIG. 1A.

FIG. 6 shows a fourth side sectional view of the wafer 2 in FIG. 1A. As shown in FIG. 1A and FIG. 6, when the wafer defect inspection system 1 of the present invention is actually applied, an optical device 17 may be further arranged between the line light source 11 and the wafer 2, and a rod lens 14 may be arranged between the optical device 17 and the wafer 2, and both the rod lens 14 and the optical device 17 may be located in an optical path of the inspection light. According to this arrangement, the inspection light can be guided by the optical device 17 to ensure that the included angle @ exists between the inspection light and the edge surface of the wafer 2. At the same time, the rod lens 14 can also be used to focus the inspection light on the surface of the wafer edge of the wafer 2.

The Second Embodiment

Figure 7:
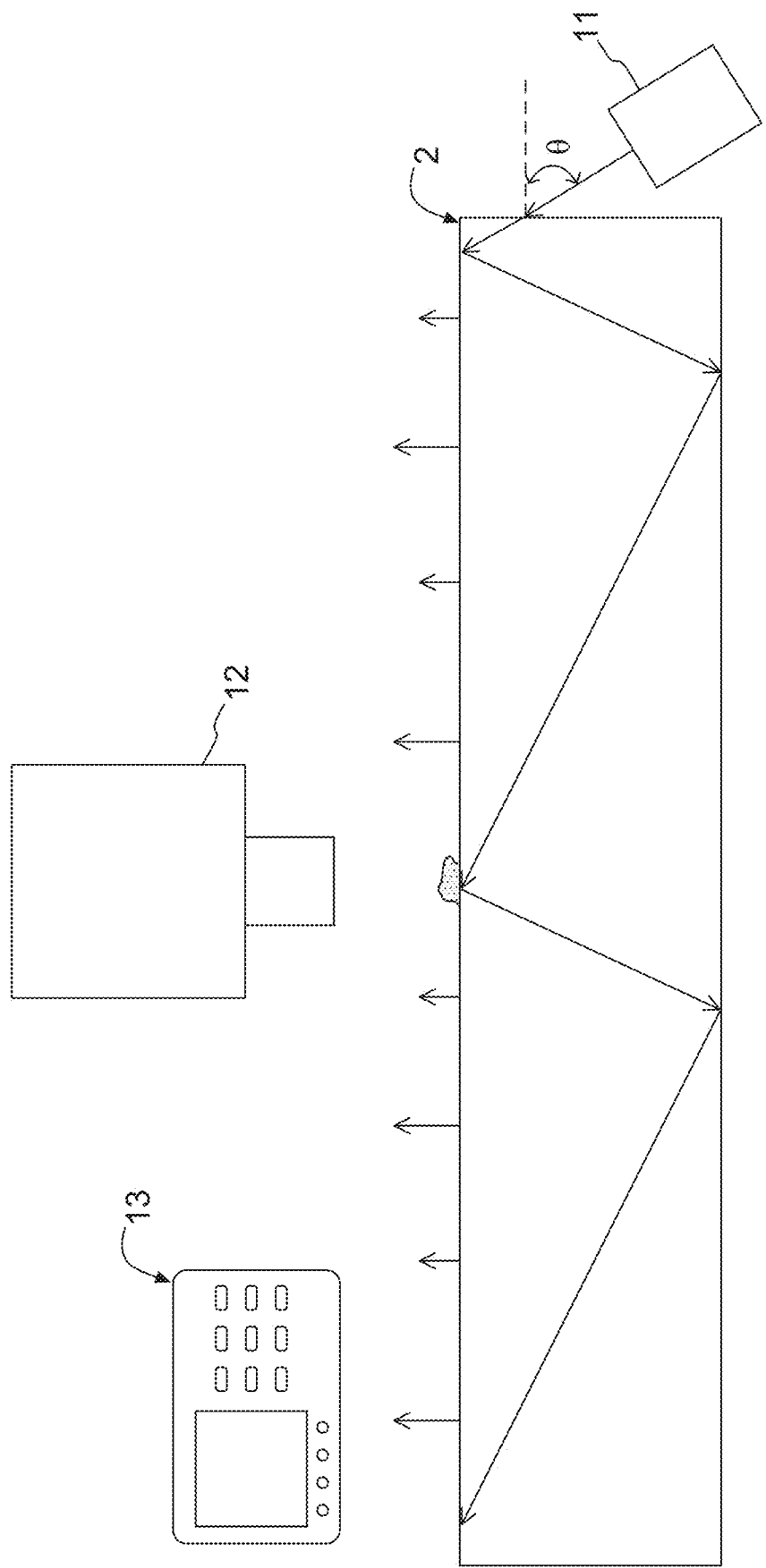
FIG. 7 is a fifth side sectional view of the wafer in FIG. 1A.

Please refer to FIG. 1A, FIG. 1B, FIG. 1C, and FIG. 2 repeatedly, and also refer to FIG. 7, which shows a fifth cross-sectional view of the wafer 2 in FIG. 1A. In the second embodiment, the wafer defect inspection system 1 of the present invention is arranged on a wafer transferring path between a first processing station and a second processing station, and is used for detecting impurity particles and/or etching residues on the surface of a wafer 2 by using the total reflection principle. Therefore, the second embodiment of the wafer defect inspection system 1 of the present invention also includes a linear light source 11, a camera 12, a processor 13 coupled with the camera 12 and the linear light source 11, a first adjusting mechanism 15, and a second adjusting mechanism 16.

As shown in FIGS. 1A and 7, the processor 131 controls the line light source 11 to provide an inspection light incident on the edge surface of the wafer, and an included angle θ between the inspection light and the edge surface is adjusted so as to cause the inspection light travel inside the wafer 2 according to the principle of total reflection. It is worth noting that if there are impurity particles and/or etching residues on the surface of the wafer 2, the light emitted from the surface of the wafer 2 will inevitably be blocked by these substances. In other words, the camera 12 and the processor 13 can judge that there are impurity particles and/or etching residues on the surface of the wafer 2 by analyzing the intensity distribution of the emitted light. Therefore, as shown in FIGS. 1A and 7, the processor 13 controls the camera 12 to acquire a wafer image containing at least one defect feature, and after processing the wafer image into an inspection wafer image, compares the wafer image with a reference wafer image, so as to determine the at least one defect feature (i.e., impurity particles and/or etching residues).

Thus, the above has completely and clearly explained a wafer defect inspection system of the present invention. It must be emphasized that the above detailed description is specific to the feasible embodiment of the present invention, but the embodiment is not used to limit the patent scope of the present invention, and any equivalent implementation or change that does not depart from the technical spirit of the present invention shall be included in the patent scope of this case.

What is claimed is:

1. A wafer defect inspection system, comprising:
   a light source adjusting mechanism;
   a line light source, being pivotally connected to the light source adjusting mechanism;
   a camera arranged above the wafer and facing the wafer; and
   an electronic device, being coupled to the light source adjusting mechanism, the camera and the line light source;
   wherein the electronic device comprises a processor and a memory storing an application program, such that the processor executes the application program so as to be configured to:
   provide, by controlling the line light source, an inspection light to be incident on an edge surface of the wafer at an included angle;
   pivot, by controlling the light source adjusting mechanism, the line light source so as to adjust the included angle, thereby causing the inspection light to travel inside the wafer according to the principle of total internal reflection; wherein, when encountering a crack in the wafer, a portion of the inspection light exits from a surface of the wafer through the crack;
   acquire, by controlling the camera, a wafer image containing at least one defect pattern from the wafer; wherein the inspection light exits from a defect position on a surface of the wafer, and the defect pattern in the wafer image corresponds to the defect position; and
   compare, the wafer image with a reference wafer image so as to identify the at least one defect patter;

wherein a rod lens is arranged between the line light source and the wafer, and located on an optical path of the inspection light, so as to enhance an illumination of the inspection light;

wherein an optical device is arranged between the line light source and the rod lens, and configured to guide the inspection light such that the inspection light vertically enters the rod lens; and wherein the optical device is selected from the group consisting of a reflector and a polariscope.

2. The wafer defect inspection system according to claim 1, wherein the defect feature is wafer scratch.

3. The wafer defect inspection system according to claim 1, wherein the camera is a line scan camera.

4. The wafer defect inspection system according to claim 1, further comprising:
a first adjusting mechanism connected with the camera and coupled with the electronic device.

5. The wafer defect inspection system according to claim 1, wherein the wafer is any one selected from a group consisting of a silicon wafer, a germanium wafer, a gallium arsenide wafer, and a gallium nitride wafer, and has any wafer size selected from a group consisting of 3 inches, 4 inches, 6 inches, 8 inches, 12 inches, and 18 inches.

6. A wafer defect inspection system, comprising:
a light source adjusting mechanism;
a line light source, being pivotally connected to the light source adjusting mechanism;
a camera arranged above the wafer and facing the wafer; and
an electronic device, being coupled to the light source adjusting mechanism, the camera and the line light source;
wherein the electronic device comprises a processor and a memory storing an application program, such that the processor executes the application program so as to be configured to:
provide, by controlling the line light source, an inspection light to be incident on an edge surface of the wafer at an included angle;
pivot, by controlling the light source adjusting mechanism, the line light source so as to adjust the included angle, thereby causing the inspection light to travel inside the wafer according to the principle of total internal reflection; wherein, under a condition that impurity particles and/or etching residues exist on a top surface of the wafer, the inspection light emitted from the top surface is blocked by the impurity particles and/or the etching residues;
acquire, by controlling the camera, a wafer image containing at least one defect pattern from the wafer; wherein the inspection light is blocked at a defect position on the top surface, and the defect feature in the wafer image corresponds to the defect position; and
compare, the wafer image with a reference wafer image so as to identify the at least one defect patter;
wherein a rod lens is arranged between the line light source and the wafer, and located on an optical path of the inspection light, so as to enhance an illumination of the inspection light;
wherein an optical device is arranged between the line light source and the rod lens, and configured to guide the inspection light such that the inspection light vertically enters the rod lens; and
wherein the optical device is selected from the group consisting of a reflector and a polariscope.

7. The wafer defect inspection system according to claim 6, wherein the camera is a line scan camera.

8. The wafer defect inspection system according to claim 6, wherein, further comprising:
a first adjusting mechanism connected with the camera and coupled with the electronic device.

9. The wafer defect inspection system according to claim 6, wherein the wafer is any one selected from a group consisting of a silicon wafer, a germanium wafer, a gallium arsenide wafer, and a gallium nitride wafer, and has any wafer size selected from a group consisting of 3 inches, 4 inches, 6 inches, 8 inches, 12 inches, and 18 inches.

* * * * *